United States Patent Office 3,394,729
Patented July 30, 1968

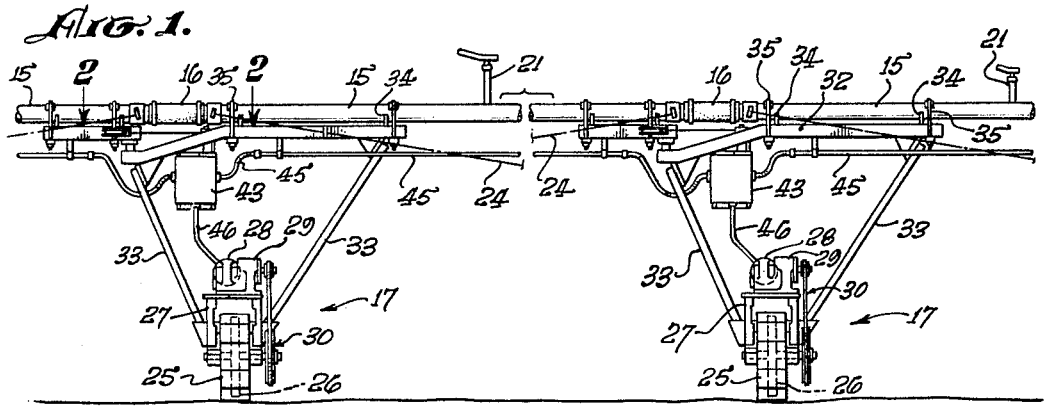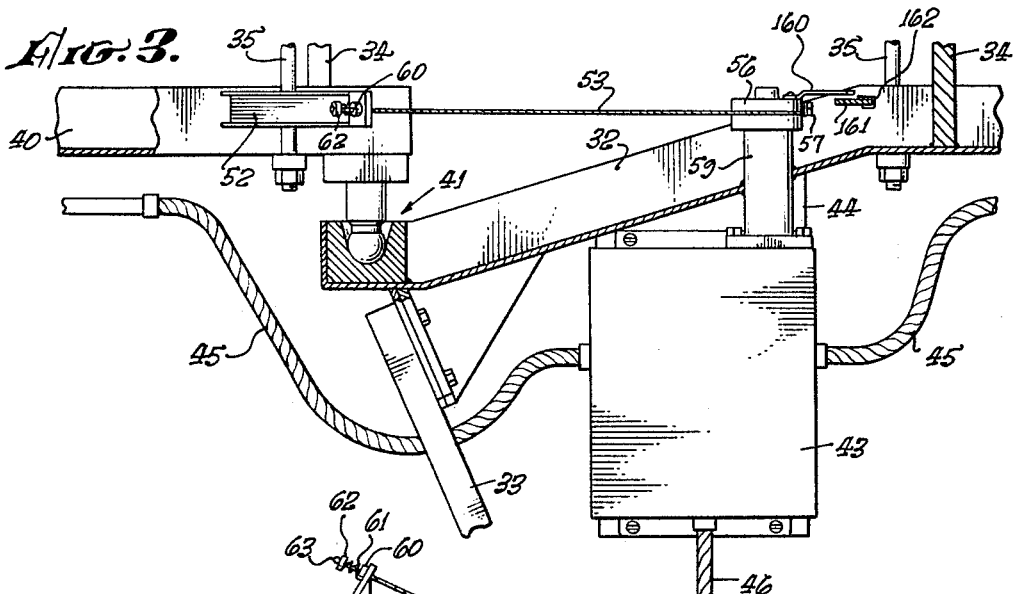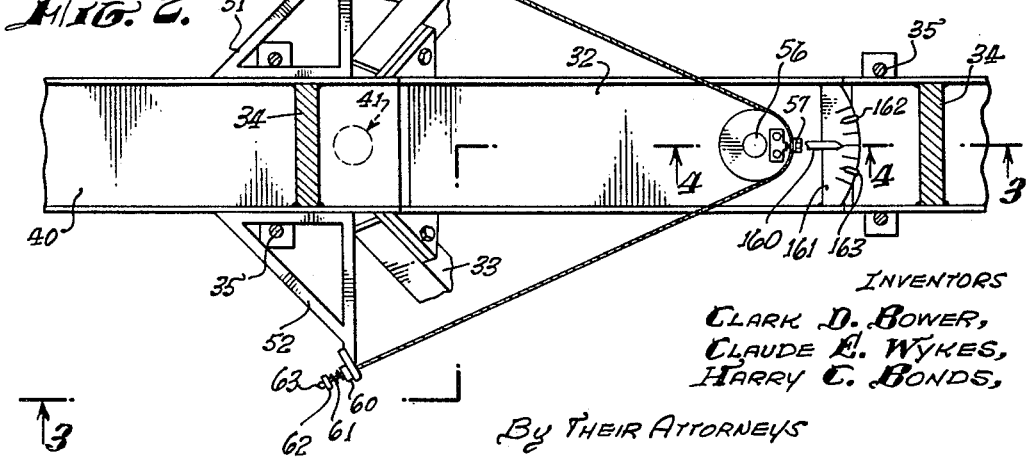

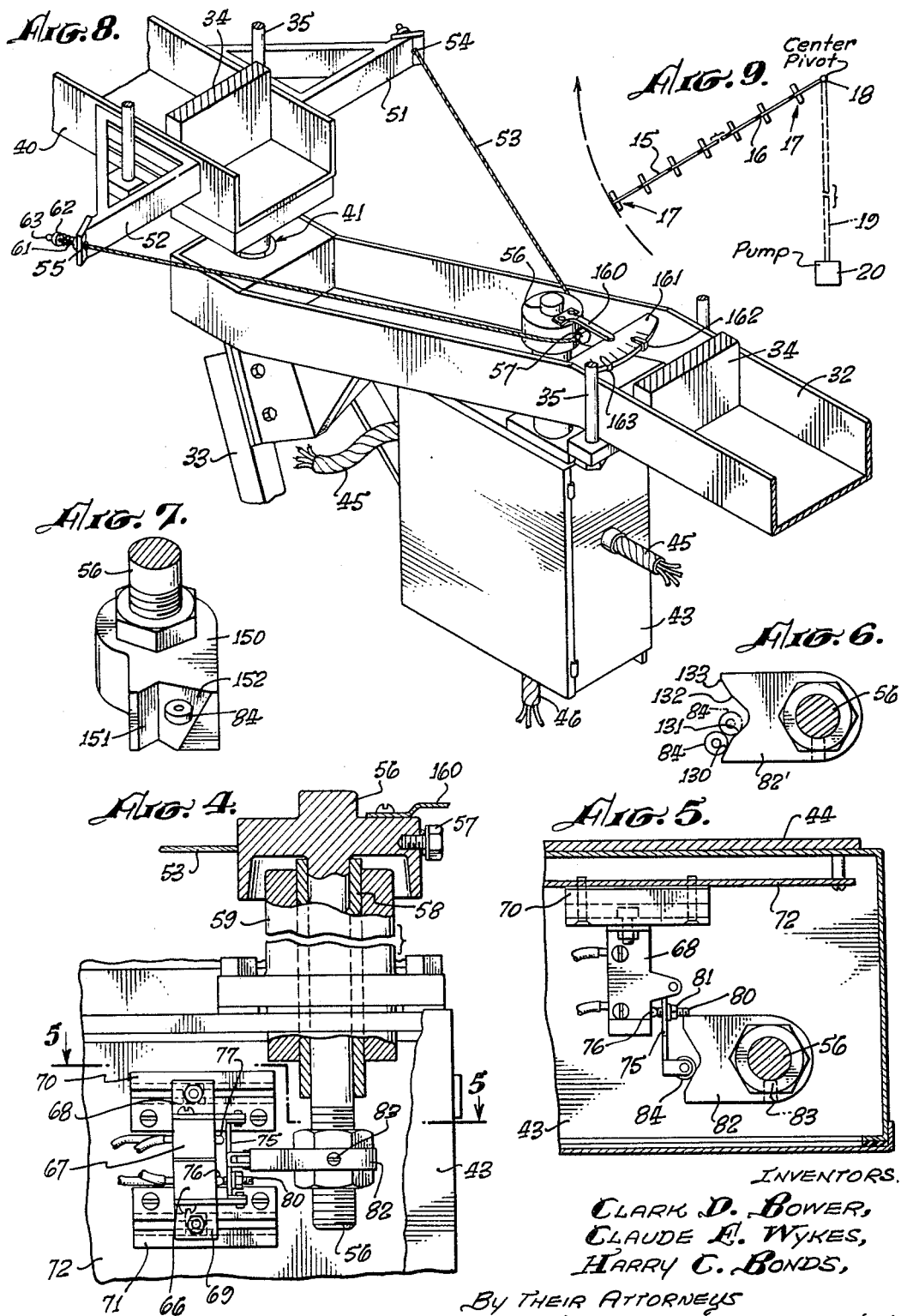

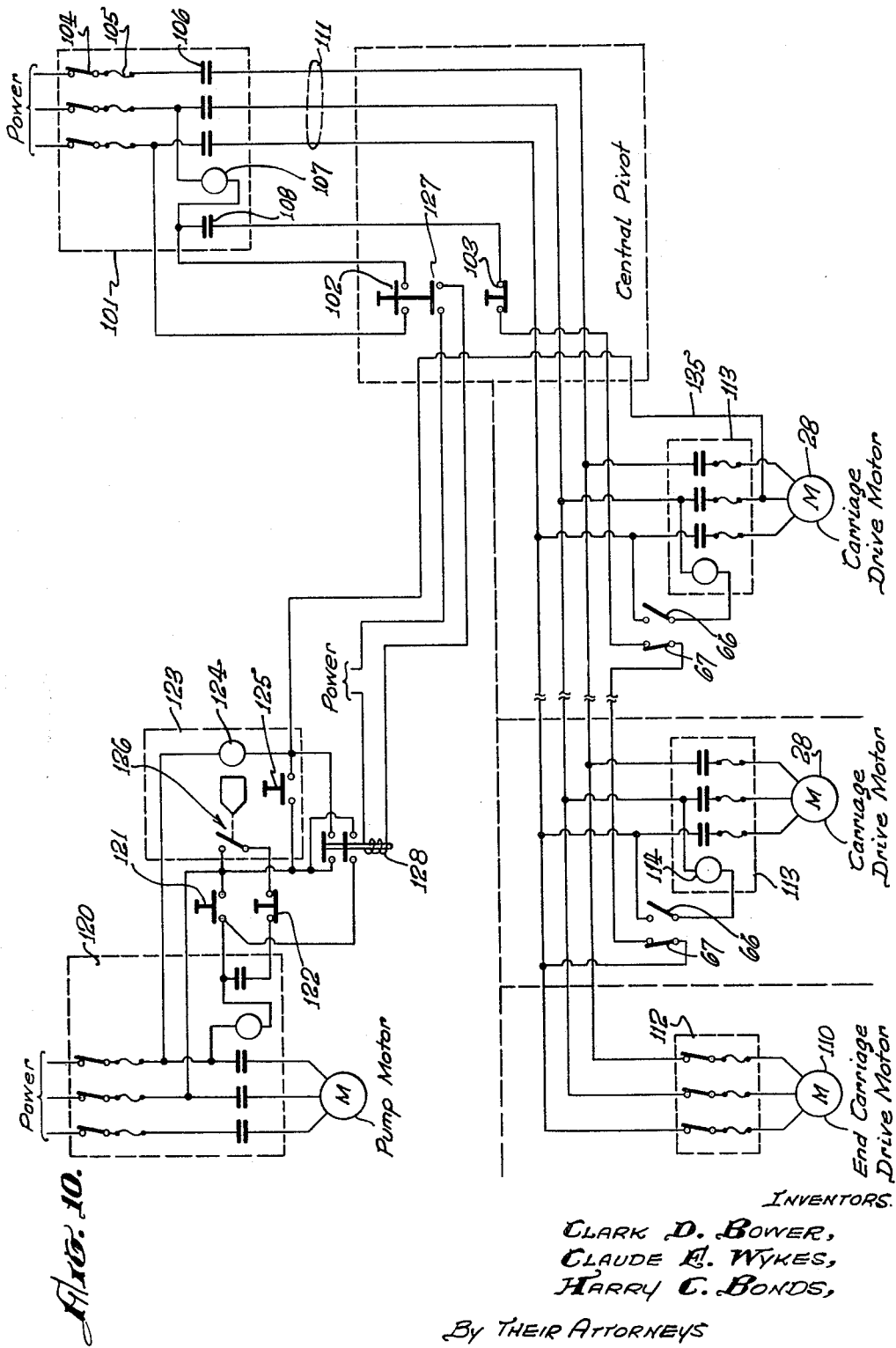

3,394,729
CONTROL SYSTEM FOR SELF-PROPELLED
SPRINKLING APPARATUS
Clark D. Bower, Whittier, Claude E. Wykes, Temple City, and Harry C. Bonds, City of Industry, Calif., assignors to Layne & Bowler Pump Company, City of Industry, Calif., a corporation of California
Filed Apr. 19, 1965, Ser. No. 448,957
14 Claims. (Cl. 137—344)

ABSTRACT OF THE DISCLOSURE

A control for the individual carriage drive motors of a multicarriage self-propelled sprinkling irrigation apparatus. A drive motor control switch actuated only by angular motion between adjacent pipes of a pipe line in a horizontal plane, while being insensitive to angular motion in the vertical plane, rotational motion of the pipe, and motion along the axis of the pipe. A specific bracket, cable and shaft arrangement for switch operation.

This invention relates to self-propelled sprinkling irrigation systems and, in particular, to a new and improved control system therefor.

Self-propelled sprinkling systems have been known and used for some time for the irrigation of crops. Such systems are particularly useful in the irrigation of large fields which have not been leveled and in the irrigation of crops which desirably should have overhead watering. In a typical system the pipeline which may be a quarter of a mile long, is carried on a plurality of motor driven carriages which move the pipeline over the field. Sprinkling heads are spaced along the pipeline for dispersing water in any desired pattern. The pipeline may be moved in a straight line or in a circular pattern or in other patterns. Typical systems are shown in the U.S. patents to Zybach No. 2,604,359, Maggart No. 2,628,863, Boice, Jr., No. 2,711,615, and Behlen No. 2,726,895. The basic problem encountered in all of these systems is the automatic maintenance of the alignment of the pipeline as the individual carriages move over the ground. The alignment problem is more severe when the sprinkling system is utilized on unleveled ground and on fields which are deeply furrowed, such as potato fields. It is an object of the present invention to provide a new and improved system for automatically controlling the alignment of the carriages of a self-propelled sprinkling system.

In a typical system, a drive motor is provided at each intermediate carriage with the motor normally off and with the motor being turned on when the carriage is behind the desired alignment. One length of pipe is mounted on the carriage and the next length of pipe is pivoted on the carriage with the ends of the pipes joined by a bendable or flexible coupling. The individual lengths of pipe, which may be 100 feet in length and supported by truss work, are relatively rigid, with most of the relative motion in the pipeline occurring in the pivotal supports on the carriages. It is this pivoting of one length of pipe with respect to the adjacent length of pipe which provides the control signal for operation of the drive motor.

It has been found that a variety of relative motions occurs between the adjacent lengths of pipe as the system moves over the ground. One length of pipe may translate with respect to the other, caused by axial compression or axial tension in the pipeline. One length of pipe may pivot in the vertical plane relative to the other as one carriage moves over a higher or lower portion of the ground than the adjacent carriage. One length of pipe may pivot in the horizontal plane relative to the other when a carriage gets behind an adjacent carriage. One length of pipe may twist or rotate about its axis relative to the adjacent pipe as one carriage noses up or noses down while negotiating a hummock or furrow. A typical control system is intended to maintain a desired alignment in the horizontal plane as the system negotiates a varying terrain. For the purpose of this application the expression "carriage drive plane" is used to refer to the plane in which the carriage moves, which would be a horizontal plane when the carriage is moving over a level field.

The sensitivity of a control system to pivoting of the lengths of pipe in the carriage drive plane is a measure of the ability of the system to maintain the desired alignment with a minimum deviation. In a sensitive system, the other relative movements referred to, such as the translation, twisting and pivoting in the plane normal to the drive plane, will affect the control system and tend to produce carriage motion. While these relative motions may be small in some situations, they are still sufficient to adversely affect operation of a sensitive control system. Accordingly, it is an object of the present invention to provide a new and improved control system which is affected only by relative motion of the lengths of pipe in the carriage drive plane and which is unaffected by other pipe movements occurring in the system.

It is a particular object of the invention to provide a self-propelled sprinkling irrigation system having a plurality of lengths of pipe supported on a plurality of motor driven carriages with the ends of adjacent pipe lengths supported and coupled together at a carriage to form a pipeline and with one length pivoting on the carriage relative to the other and a control for a carriage motor for maintaining desired alignment of the pipeline including switching means for turning the carriage drive motor on and off, means responsive only to pivoting of said lengths of pipe in the drive plane of the carriage, and means for connecting the responsive means to the switching means in controlling relation for turning the drive motor on when the lengths of pipe pivot relative to each other in the carriage drive plane more than a predetermined amount behind the desired alignment position.

It is a further object of the invention to provide such a new and improved control including a shaft mounted for rotation with respect to one length of pipe and a cable coupled adjacent its ends to spaced points on the other length of pipe and engaging the shaft in driving relation intermediate the points, with shaft rotation corresponding to pivoting movement of the pipe lengths. A further object is to provide such a structure incorporating resilient means such as in the cable or for coupling the cable to the spaced points, with the points lying in a plane substantially parallel to the carriage drive plane.

It is an object to provide a control system including a rotating drive shaft carrying a cam and moving in response to pivoting of the lengths of pipe, switching means for turning a carriage drive motor on and off and incorporating a cam follower, with the mechanism arranged for actuation of the switching means by the rotating shaft via the cam and cam follower. An additional object is to provide such a mechanism including a cam with a plurality of differently oriented cam surfaces or with a varying surface and with the cam position being adjustable for driving the cam follower on a selected surface or portion of a surface for varying the sensitivity of the system.

It is an object of the invention to provide such a control system incorporating a single mechanism for actuating the drive motor on and off switch and for actuating the safety circuit switch. A further object is to provide such a system incorporating new and novel control circuitry. An additional object is to provide such a system which may incorporate various sources of power for the carriage drive motors, such as electric motor driven carriages, hydraulic motor driven carriages, internal combustion engine driven carriages and the like.

It is a particular object of the invention to provide a new and improved self-propelled sprinkling irrigation system which is simple and reliable in operation and which is easy to assemble and adjust in the field. A further object is to provide a control system which has a minimum of moving parts and a minimum exposure to the elements and one which is not susceptible to malfunctions caused by fertilizers, dust and the like. An additional object is to provide such a control system incorporating low mass mechanisms with small mechanical ratios for minimizing the effects of unbalance, vibration, inertia and the like. These factors are of great importance in the practical operation of sprinklers wherein hundred foot lengths of pipe are supported between carriages and alignment is maintained within a few inches.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:

FIG. 1 is a side view of a pair of spaced carriages as they move away from the viewer;

FIG. 2 is an enlarged partial sectional view taken along the line 2—2 of FIG. 1;

FIG. 3 is a sectional view taken along the line 3—3 of FIG. 2;

FIG. 4 is an enlarged partial sectional view taken along the line 4—4 of FIG. 2;

FIG. 5 is a sectional view taken along the line 5—5 of FIG. 4;

FIG. 6 is a view illustrating an alternative form of the cam of FIG. 5;

FIG. 7 is an isometric view illustrating another alternative form of the cam;

FIG. 8 is a perspective view of the pivotal support of FIGS. 2 and 3;

FIG. 9 is a plan view illustrating the operation of a complete system in a field; and FIG. 10 is an electrical schematic of the system of FIGS. 1–9.

In the self-propelled sprinkling irrigation system illustrated herein, a plurality of lengths of pipe 15 are joined by flexible couplings 16 to form a pipeline. The pipeline is supported adjacent the couplings on carriages 17 which are motor driven and function to move the pipeline along a field. The pipeline may be moved along a path perpendicular to the axis of the line to provide a rectangular sprinkling pattern or may be moved in a radius to provide a circular pattern as shown in FIG. 9. In the circular pattern, the line moves about a central pivot 18 at which point the line is connected to a source of water which may be supplied from a well at the central pivot or from a buried pipeline 19 and remotely positioned pump 20. One or more sprinkling heads 21 may be provided on each length of pipe for distributing the water. In a typical installation, the individual lengths of pipe 15 may be in the order of 100 feet long and 14 carriages may be utilized to provide a pipeline in the order of a quarter of a mile in over-all length. A hundred foot length of four inch or six inch pipe full of water is quite heavy and the individual pipe lengths typically are supported by rod or cable trusses, indicated schematically at 24 (FIG. 2) to make each length of pipe relatively rigid.

In the operation of the system, one of the carriages, usually the outermost carriage, is operated continuously at a substantially constant speed which may be adjusted to provide any desired rate of travel of the system over the field. The drive motors of the remaining carriages are normally off. The drive motor of each individual carriage is turned on when the particular carriage is behind the desired alignment position and the motor operates until the carriage is moved forward to the desired alignment position. In a typical installation, a carriage drive motor may be turned on when the carriage is behind the straight line alignment position by about four inches and will be turned off when the carriage has moved forward about eight inches to the straight line position. The turn on and turn off positions are variable by adjustment of the control system and can be changed to suit any desired mode of operation. In a typical installation for a circular pattern, a carriage motor will be on for a few seconds at a time with the carriages near the outer end of the line going on several times a minute and with the carriages near the central pivot going on only once in several minutes. In a typical rectangular pattern installation, the on time and off time will be substantially the same for each controlled carriage with one motor being on continuously to set the desired over-all rate.

A carriage 17 may incorporate an endless track 25 running on a pair of sprockets 26 supported in a frame 27. One of the sprockets is driven by an electric motor 28 with a gear reduction unit 29 and a further speed reduction pulley and belt or chain drive system 30 (FIG. 1).

A channel member 32 is supported on the frame 27 by upstanding arms 33. One length of pipe 15 rests on cradles 34 in the channel 32 and is clamped thereto by U-bolts 35.

Another channel member 40 is pivotally mounted on the channel member 32 by a ball and socket joint 41 (FIG. 3). Another length of pipe is clamped to the channel member 40 by similar cradles 34 and U-bolts 35. A control box 43 is mounted on a plate 44 suspended from the channel member 32. The electrical wiring for this system is carried in conduits or cables 45 supported on the pipeline for interconnecting the control box 43 and in conduits 46 interconnecting the control boxes and the associated motors.

In the preferred embodiment of the control system illustrated herein, brackets 51, 52 are mounted on opposite sides of the channel member 40. A cable 53 passes through an opening 54 in the bracket 51 (FIG. 8) and through a similar opening 55 in the bracket 52. The central portion of the cable 53 is coupled to a shaft 56, as by passing the cable around the shaft. A screw 57 may be inserted in the periphery of the shaft 56 to anchor the cable. The shaft 56 is mounted for rotation in a bushing 58 carried in a boss 59 mounted on the upper surface of the box 43 (FIG. 4).

A resilient termination may be provided at each end of the cable 53 and typically may comprise a washer 60, a coil spring 61, and another washer 62 with the cable passing through the assembly and terminating in an enlarged end section 63 (FIG. 2). Alternatively a resilient cable may be used. It has been found that a steel wire cable has sufficient resiliency to function satisfactorily in some installations.

A switch 66 for turning the carriage drive motor on and off is mounted within the control box 43 for actuation by the shaft 56. In the illustrated embodiment, the drive switch 66 and a similar safety control switch 67 are mounted between brackets 68, 69, which brackets are in turn slidably mounted in channel members 70, 71 carried on a plate 72 within the control box 43. A lever in the form of a plate 75 is pivotally mounted on the brackets 68, 69 for engaging the actuating members 76, 77 of the switches 66, 67, respectively. In the form illustrated, the switches 66, 67 are push actuated snap action switches, the switch 6 being closed upon depression of the member 76 and the switch 67 being opened upon depression of the member 77.

Means are provided for controlling the relative operation of the two switches so that the carriage motor control may be actuated before the safety circuit is actuated. A threaded shaft 80 is mounted in a threaded boss on the plate 75 and is locked in placed by a nut 81, so that the member 76 is engaged before the member 77 is engaged.

Means are provided for operating the lever 75 as a function of rotation of the shaft 56 and typically may comprise a cam 82 mounted on a lower portion of the shaft 56 by a pair of nuts threaded onto the shaft. A set screw 83 may also be used for holding the cam in place. A roller 84 may be positioned at the outer end of the plate 75 to serve as a cam follower.

Referring now to the electrical schematic of FIG. 10, electrical power, typically three-phase A.C., is provided for energizing the carriage drive motors via a main starter 101 which is controlled by a start button 102 and a stop button 103. The starter 101 includes manual disconnect switches 104, fuses 105, and solenoid operated contacts 106 for each phase. The contacts 106 are closed when a solenoid 107 is energized via the start button 102. The solenoid 107 is maintained energized after the start button 102 is released through the contacts 108 which are closed at the same time as the contacts 106 and through the stop button 103 and through the normally closed safety switch 67 at each of the carriages (except for the end carriage). The main starter 101 may be located at the pump house or at a control house or at the central pivot or any other location which is convenient.

The motor 110 for the end carriage is energized from the main starter 101 via a cable 111 which goes to the central pivot and thence through the pipeline conduit to a control box 112 having the usual manual disconnect switches and fuses for each line. The cable 111 may be wrapped around the central pivot several times to allow for several revolutions of the system. Alternatively, slip rings can be used on the central pivot for electrical connection to the moving system. A starter 113 is provided for each intermediate carriage drive motor. The contacts of the starter 113 are closed by a solenoid 114 energized by the normally open switch 66. A similar starter and switch arrangement is provided for each intermediate carriage so that each carriage drive motor can be energized independently or the others.

A separate control circuit is provided for the pump motor which provides the sprinkling water to the pipeline. A pump starter 120 similar to the starter 101 is controlled by a start switch 121 and a stop switch 122. A time delay unit 123 provides for maintaining the pump in operation a preset length of time after the carriage drive motors are shut down. The time delay unit includes a solenoid 124 which when energized, as by closing switch 125, closes a switch 126. The time delay unit will then maintain the switch 126 closed for a predetermined period such as thirty minutes.

A relay 128 is energized from a power source via a set of contacts 127 on the carriage motor start switch 102. The energization of the relay 128 closes two sets of contacts connected in parallel with the switches 121 and 125 respectively.

The system may be turned on by an operator at the central pivot by depressing the start button 102. The solenoid 107 of the starter 101 is energized, closing the contacts 106 providing motor power to each of the carriages. The motor for the end carriage starts running at rated speed and runs conitnuously. The relay 128 is energized, thereby energizing the solenoid 124 of the time delay unit closing the switch 126 and also energizing the solenoid of the pump motor starter 120 so that water is being pumped. If it is desired to operate the carriage motors without pumping water, as for the purpose of testing the control system, the manual switches of the starter 120 can be opened. The system can be stopped by opening the manual switch at the end motor control box 112 and can be started by closing this switch if the power circuit at the main starter 101 is closed.

When the outermost carriage moves forward a predetermined amount, typically about four inches, the pivotally supported pipe at the next inner carriage will have pivoted clockwise as viewed from above an amount sufficient to rotate the shaft 56 and close the switch 66. When the switch 66 is closed, the solenoid 114 of the carriage motor starter will be energized, applying power to the drive motor. As the carriage moves forward, the shaft 56 is rotated in the opposite direction and forward motion continues until the switch 66 is opened. The amount of forward motion occurring is a function of the dimensions and shapes of the various parts, the speed and gear ratio of the drive motor, and the mechanical hysteresis in the switch itself. These parameters can be varied as desired to vary the sensitivity and timing of the system. In a typical system, the angular motion at the carriage is in the order of three to five degrees and the cam roller 84 moves back and forth about one eighth of an inch at the cam. The same mode of operation occurs for movement in a rectangular pattern.

The angle of the cam surface is one of the parameters which controls the amount of travel and the system sensitivity. In one alternative form, a cam with two or more surfaces at different angles can be used, providing for a simple change in system sensitivity. Such a cam is illustrated in FIG. 6 wherein the cam 82' has surfaces 130, 131, 132, 133, each having a different slope. The cam may be positioned on the shaft 56 so as to engage the roller 84 along one of the surfaces such as the surface 130 as illustrated in solid lines or the surface 131 as indicated in dashed lines.

Another alternative form of cam is shown in FIG. 7. The cam 150 has a surface 151 of uniform angle and a surface 152 of an angle which varies along the axis of rotation of the cam. The surface 152 provides the on-off control while both surfaces 151 and 152 provide the safety control. The cam 150 may be moved along the axis of the shaft 56 to bring any portion of the surface 152 into engagement with the roller 84 to provide various sensitivities for the on-off control without affecting the relation of the roller 84 and the surface 151.

The system will continue to operate indefinitely in this manner, with each individual carriage drive motor being turned on when its carriage is behind the desired alignment position. In the circular or arcuate system, the outer carriages will be turned on more often than the inner carriages but under ordinary operating conditions, each carriage when turned on will be on for about the same period of time. In the rectangular or straight system, the turn-on cycle will be about the same for each carriage.

The safety circuit is operated when one of the carriages gets too far behind or too far ahead of the desired position, with the pivoted plate 75 being moved far enough to engage and actuate the safety switch 67 of the particular carriage involved. When the switch 67 is actuated, the holding circuit for the solenoid 107 of the main starter 101 is de-energized, thereby opening the contacts 106 and shutting off power to all of the drive motors. If the motor power system is not turned on again within the time provided for by the time delay unit 123, the pump motor will also be shut down. With the control arrangement as shown in FIG. 10, the drive motor power can be turned on only by operation of the start switch 102 at the central pivot. During normal operation, the time delay unit 123 is reset to its full time period each time the innermost carriage drive motor is energized. This is accomplished by a line 135 connecting one phase of the carriage drive motor to the solenoid 124 of the time delay unit. Hence whenever the innermost drive motor is not operated for the period of the time delay unit, the pump motor will be shut off. Alternatively, the line 135 may be connected to one phase of the line 111 at the starter 101 or at the central pivot.

The shaft 56 is responsive to the torque produced by the pivoting length of pipe as it pivots with respect to the carriage supporting the adjacent length of pipe. The cable 53 is illustrated as a conventional steel cable but of course other equivalent structures could be utilized, such as a flat strip or ribbon or even a plate or rigid frame, but the cable is the easiest and simplest to install and maintain. The coupling points of the cable with the pivoting pipe, which are at the openings 54, 55 of the brackets 51, 52, respectively, should lie in a plane which is parallel to the carriage drive plane. This would be a horizontal plane when the carriage is sitting on a flat field. With this arrangement, pivoting of one pipe in a vertical plane with respect to the other does not produce rotation of the shaft. Similarly twisting or rotation of one pipe about its axis with respect to the other produces no rotation of the shaft 56 and translation of one pipe toward or away from the other produces no rotation of the shaft.

An indicator arrangement may be incorporated on each carriage to indicate the angular relation of the two lengths of pipe at the carriage and thereby provide the operator with information as to which, if any, of the safety switches 67 have been opened when the system is shut off. In the present commercial units, the angular control is very tight so that a deviation from normal alignment of six to ten degrees will open a safety switch. It is difficult for an operator to visually inspect the pipe line and determine which carriage needs repositioning. A position indicator simplifies this problem.

The indicator may include a pointer 160 mounted on the shaft 56 (FIG. 2) and a scale 161 mounted on the channel member 32. Adjustable markers 162, 163 may be carried on the scale 161 for positioning at the operating limits permitted by the safety switch setting. The scale may be calibrated in degrees if desired.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In a self-propelled sprinkling irrigation system having a plurality of lengths of pipe supported on a plurality of motor driven carriages with the ends of adjacent pipe lengths supported and coupled together at a carriage to form a pipeline and with the carriage having a drive plane and with the adjacent lengths of pipe movable relative to each other by pivoting in the drive plane of the carriage and in a plane perpendicular to the drive plane and by rotation about the longitudinal axis of the pipe and by translation along the longitudinal axis of the pipe, a control for a carriage motor for maintaining desired alignment of the pipeline, including in combination:

switching means for turning the carriage drive motor on and off;

means responsive only to pivoting of said lengths of pipe in the drive plane of said carriage; and means for connecting said responsive means to said switching means in controlling relation for turning said drive motor on when said lengths of pipe pivot relative to each other in the carriage drive plane more than a predetermined amount behind the desired alignment position.

2. In a self-propelled sprinkling irrigation system having a plurality of lengths of pipe supported on a plurality of motor driven carriages and joined at couplings to form a pipeline, with the carriage having a drive plane, a control for a carriage motor for maintaining desired alignment of the pipeline, including in combination:

switching means for turning the carriage drive motor on and off;

means for mounting one end of a first length of pipe on the carriage;

means for pivotally mounting the adjacent end of a second length of pipe on said carriage in substantial alignment with said first length of pipe with the two lengths of pipe coupled together at said carriage, and with the coupled pipe lengths movable relative to each other axially and in rotation about the longitudinal axis thereof and pivotally in the carriage drive plane and in a plane normal to the carriage drive plane;

means responsive only to pivoting of said lengths of pipe in the drive plane of said carriage; and means for connecting said responsive means to said switching means in controlling relation for turning said drive motor on when said lengths of pipe pivot relative to each other in the carriage drive plane more than a predetermined amount behind the desired alignment position.

3. In a self-propelled sprinkling irrigation system having a plurality of lengths of pipe supported on a plurality of motor driven carriages with the ends of adjacent pipe lengths supported and coupled together at a carriage to form a pipeline and with one length pivoting on the carriage relative to the other and with the carriage having a drive plane, a control for a carriage motor for maintaining desired alignment of the pipeline, including in combination:

switching means for turning the carriage drive motor on and off;

a shaft mounted for rotation with respect to a first of said lengths of pipe;

a pair of brackets disposed on opposite sides of a second of said lengths of pipe;

a cable coupled to each of said brackets at points lying in a plane substantially parallel to said carriage drive plane and engaging said shaft in driving relation intermediate said brackets; and means for coupling said shaft to said switching means in controlling relation for turning said drive motor on when said lengths of pipe pivot relative to each other in the carriage drive plane more than a predetermined amount behind the desired alignment position.

4. In a self-propelled sprinkling irrigation system having a plurality of lengths of pipe supported on a plurality of motor driven carriages with the ends of adjacent pipe lengths supported and coupled together at a carriage to form a pipeline and with one length pivoting on the carriage relative to the other and with the carriage having a drive plane, a control for a carriage motor for maintaining desired alignment of the pipeline, including in combination:

switching means for turning the carriage drive motor on and off;

a shaft mounted for rotation with respect to a first of said lengths of pipe;

a pair of brackets disposed on opposite sides of a second of said lengths of pipe;

a cable engaging said shaft in driving relation;

resilient means for coupling said cable to each of said brackets adjacent the ends of said cable; and means for coupling said shaft to said switching means in controlling relation for turning said drive motor on when said lengths of pipe pivot relative to each other in the carriage drive plane more than a predetermined amount behind the desired alignment position.

5. In a self-propelled sprinkling irrigation system having a plurality of lengths of pipe supported on a plurality of motor driven carriages and joined at couplings to form a pipeline, with the carriage having a drive plane, a control for a carriage motor for maintaining desired alignment of the pipeline, including in combination:

switching means for turning the carriage drive motor on and off;

means for mounting one end of a first length of pipe on the carriage;

means for pivotally mounting the adjacent end of a second length of pipe on said carriage in substantial alignment with said first length of pipe with the two lengths of pipe coupled together at said carriage;

torque responsive means mounted on said carriage;

a cable engaging said torque responsive means in driving relation;

means for coupling said cable adjacent each of its ends to spaced points of said pivotally mounted second length of pipe; and means for connecting said torque responsive means to said switching means in controlling relation for turning said drive motor on when said lengths of pipe pivot relative to each other in the carriage drive plane more than a predetermined amount behind the desired alignment position.

6. In a self-propelled sprinkling irrigation system having a plurality of lengths of pipe supported on a plurality of motor driven carriages and joined at couplings to form a pipeline, with the carriage having a drive plane, a control for a carriage motor for maintaining desired alignment of the pipeline, including in combination:

switching means for turning the carriage drive motor on and off;

means for mounting one end of a first length of pipe on the carriage;

means for pivotally mounting the adjacent end of a second length of pipe on said carriage in substantial alignment with said first length of pipe with the two lengths of pipe coupled together at said carriage;

a shaft mounted on said carriage for rotation about an axis perpendicular to the carriage drive plane;

a cable engaging said shaft in driving relation intermediate the cable ends;

means for coupling said cable adjacent each of its ends to spaced points of said pivotally mounted second length of pipe with said points lying in a plane substantially parallel to the carriage drive plane; and means for connecting said shaft to said switching means in controlling relation for turning said drive motor on when said lengths of pipe pivot relative to each other in the carriage drive plane more than a predetermined amount behind the desired alignment position.

7. In a self-propelled sprinkling irrigation system having a plurality of lengths of pipe supported on a plurality of motor driven carriages with the ends of adjacent pipe lengths supported and coupled together at a carriage to form a pipeline and with the carriage having a drive plane and with the adjacent lengths of pipe movable relative to each other by pivoting in the drive plane of the carriage and in a plane perpendicular to the drive plane and by rotation about the longitudinal axis of the pipe and by translation along the longitudinal axis of the pipe, a control for a carriage motor for maintaining desired alignment of the pipeline, including in combination:

switching means for turning the carriage drive motor on and off and including a cam follower;

means responsive only to pivoting of said lengths of pipe in the drive plane of said carriage and including a drive shaft rotating about its longitudinal axis in response to such pivoting; and a cam on said drive shaft and engaging said cam follower for turning said drive motor on when said lengths of pipe pivot relative to each other in the carriage drive plane more than a predetermined amount behind the desired alignment position.

8. A system as defined in claim 7 in which said cam has a plurality of cam surfaces with different angular relations and including means for adjusting the relative position of said cam and follower to bring selected cam surfaces into engagement with the follower for varying the sensitivity of the system.

9. A system as defined in claim 7 in which said cam has a cam surface with a cam angle varying along the axis of said shaft and with said cam movable along said shaft axis to bring a selected portion of the cam surface into engagement with the follower for varying the sensitivity of the system.

10. In a self-propelled sprinkling irrigation system having a plurality of lengths of pipe supported on a plurality of motor driven carriages and joined at couplings to form a pipeline, with the carriage having a drive plane, a control for a carriage motor for maintaining desired alignment of the pipeline, including in combination:

a switch for turning the carriage drive motor on and off;

a pivotally mounted lever for actuating said switch;

means for mounting one end of a first length of pipe on the carriage;

means for pivotally mounting the adjacent end of a second length of pipe on said carriage in substantial alignment with said first length of pipe with the two lengths of pipe coupled together at said carriage;

a shaft mounted on said carriage for rotation about an axis;

a cable engaging said shaft in driving relation;

means for coupling said cable adjacent each of its ends to spaced points of said pivotally mounted second length of pipe; and a cam and cam follower for coupling said shaft and lever in controlling relation for actuating said switch and turning said drive motor on when said lengths of pipe pivot relative to each other in the carriage drive plane more than a predetermined amount behind the desired alignment position.

11. In a self-propelled sprinkling irrigation system having a plurality of lengths of pipe supported on a plurality of motor driven carriages and joined at couplings to form a pipeline, with the carriage having a drive plane, a control for a carriage motor for maintaining desired alignment of the pipeline, including in combination:

a first switch for turning the carriage drive motor on and off;

a second switch for a safety control circuit;

a pivotally mounted lever for actuating said switches including means for engaging said first switch on pivoting through a first angle and means for engaging said second switch on pivoting through a great angle;

means for mounting one end of a first length of pipe on the carriage;

means for pivotally mounting the adjacent end of a second length of pipe on said carriage in substantial alignment with said first length of pipe with the two lengths of pipe coupled together at said carriage;

a shaft mounted on said carriage for rotation about an axis;

a cable engaging said shaft in driving relation;

means for coupling said cable adjacent each of its ends to spaced points of said pivotally mounted second length of pipe; and a cam and follower for coupling said shaft and lever in controlling relation for actuating said first switch and turning said drive motor on when said lengths of pipe pivot relative to each other in the carriage drive plane more than a first predetermined amount behind the desired alignment position and for actuating said second switch when said lengths of pipe pivot a second predetermined amount greater than said first amount.

12. In a self-propelled sprinkling irrigation system having a plurality of lengths of pipe supported on a plurality of motor driven carriages with the ends of adjacent pipe lengths supported and coupled together at a carriage to form a pipeline and with the carriage having a drive plane and with the adjacent lengths of pipe movable relative to each other by pivoting in the drive plane of the carriage and in a plane perpendicular to the drive plane and by rotation about the longitudinal axis of the pipe and by translation along the longitudinal axis of the pipe, a control for a carriage motor for maintaining desired alignment of the pipeline, including in combination:

Switch means fixed with respect to one of said lengths of pipe for turning the carriage drive motor on and off;

switch actuating means driven by the other of said lengths of pipe responsive only to pivoting of said lengths of pipe in the drive plane of said carriage; and means for connecting said switch actuating means to said switch means in controlling relation for turning said drive motor on when said lengths of pipe pivot relative to each other in the carriage drive plane more than a predetermined amount behind the desired alignment position.

13. In a self-propelled sprinkling irrigation system having a plurality of lengths of pipe supported on a plurality of motor driven carriage with the ends of adjacent pipe lengths supported and coupled together at a carriage to form a pipeline and with the carriage having a drive plane and with the adjacent lengths of pipe movable relative to each other by pivoting in the drive plane of the carriage and in a plane perpendicular to the drive plane and by rotation about the longitudinal axis of the pipe and by translation along the longitudinal axis of the pipe, a control for a carriage motor for maintaining desired alignment to the pipeline, including in combination:

switching means including a first switch for turning the carriage drive motor on and off and a second switch for a safety control circuit;

a single lever means for actuating said switches;

means responsive only to pivoting of said lengths of pipe in the drive plane of said carriage; and means for connecting said responsive means to said lever means in controlling relation for actuating said first switch and turning said drive motor on when said lengths of pipe pivot relative to each other in the carriage drive plane more than a first predetermined amount behind the desired alignment position and for actuating said second switch when said lengths of pipe pivot a second predetermined amount greater than said first amount.

14. In a self-propelled sprinkling irrigation system having a plurality of lengths of pipe supported on a plurality of motor driven carriages and joined at couplings to form a pipeline, with the carriage having a drive plane, a control for a carriage motor for maintaining desired alignment of the pipeline, including in combination:

a first switch for turning the carriage drive motor on and off;

a switch for safety control circuit;

means for mounting one end of a first length of pipe on the carriage;

means for pivotally mounting the adjacent end of a second length of pipe on said carriage in substantial alignment with said first length of pipe with the two lengths of pipe coupled together at said carriage;

a shaft mounted on said carriage for rotation about an axis;

a cable engaging said shaft in driving relation;

means for coupling said cable adjacent each of its ends to space points of said pivotally mounted second length of pipe;

means for coupling said shaft to said switches in controlling relation for actuating said first switch and turning said drive motor on when said lengths of pipe pivot relative to each other in the carriage drive plane more than a first predetermined amount behind the desired alignment position and for actuating said second switch when said lengths of pipe pivot a second predetermined amount greater than said first amount; and indicator means including a pointer element and a scale element, with one of said elements mounted on said shaft and the other of said elements mounted on said carriage for indicating the angular relation of said lengths of pipe.

References Cited

UNITED STATES PATENTS

| | | | |
|---|---|---|---|
| 1,978,435 | 10/1934 | Reinecke et al. | 137—624.12 X |
| 2,658,516 | 11/1953 | Luppold et al. | 137—624.12 X |
| 2,678,844 | 5/1954 | Hondeville | 239—213 |
| 2,800,364 | 7/1957 | Dick et al. | 239—212 X |
| 2,801,132 | 7/1957 | Shuck | 239—212 X |
| 2,935,198 | 5/1960 | Keyzer et al. | 251—251 X |
| 2,941,727 | 6/1960 | Zyback | 239—212 X |
| 2,962,610 | 11/1960 | Husband | 137—624.11 X |
| 3,202,172 | 8/1965 | Bergeron et al. | 137—344 |
| 3,245,595 | 4/1966 | Purtell | 137—344 X |
| 2,096,528 | 10/1937 | Saunders | 251—254 |

SAMUEL SCOTT, *Primary Examiner.*

UNITED STATES PATENT OFFICE
CERTIFICATE OF CORRECTION

Patent No. 3,394,729                            July 30, 1968

Clark D. Bower et al.

It is certified that error appears in the above identified patent and that said Letters Patent are hereby corrected as shown below:

Column 4, line 20, before "motor" insert -- carriage --; line 38, "box 43" should read -- boxes 43 --. Column 5, line 3, "placed" should read -- place --; line 43, "or" should read -- of --; line 46, after "pump" insert -- motor --; line 65, "conitnuously" should read -- continuously --. Column 10, line 42, "great" should read -- greater --. Column 11, line 26, "to" should read -- of --. Column 12, line 3, before "switch" insert -- second --; same line 3, before "safety" insert -- a --; line 14, "space" should read -- spaced --.

Signed and sealed this 30th day of December 1969.

(SEAL)

Attest:

Edward M. Fletcher, Jr.

Attesting Officer

WILLIAM E. SCHUYLER, JR.
Commissioner of Patents